United States Patent [19]

Shikama

[11] Patent Number: 4,755,701
[45] Date of Patent: Jul. 5, 1988

[54] BRUSHLESS MOTOR HAVING A FREQUENCY SIGNAL GENERATOR AND A PULSE SIGNAL GENERATOR

[75] Inventor: Shuuichi Shikama, Saitama, Japan

[73] Assignees: Sanyo Electric Co., Ltd.; Kumagaya Seimitsu Co., both of Japan

[21] Appl. No.: 47,883

[22] Filed: May 8, 1987

[30] Foreign Application Priority Data

May 9, 1986 [JP] Japan ................................. 61-107317

[51] Int. Cl.⁴ .............................................. H02K 21/12
[52] U.S. Cl. .................................... 310/156; 310/49 R
[58] Field of Search ................. 310/49 R, 67 R, 68 R, 310/68 B, 156, 268; 318/138, 254, 439

[56] References Cited

U.S. PATENT DOCUMENTS 4,260,920  4/1981  Nakamura et al. ............ 310/49 R X
4,417,186  11/1983  Hirose et al. ..................... 310/156 X
4,639,084  1/1987  Kugioka ......................... 310/49 R X

*Primary Examiner*—Mark O. Budd
*Attorney, Agent, or Firm*—Darby & Darby

[57] ABSTRACT

A brushless motor comprises a stator and a rotor fixed to a rotary shaft. A first magnetic poles row is formed on an inner peripheral surface of an annular magnet included in the rotor. A second magnetic poles row having magnetic poles of a number larger than that of magnetic poles included in the first magnetic poles row is formed on the bottom end surface of the annular magnet, which is magnetized in an axial direction of the rotary shaft and is magnetized in an alternately opposite polarity in a circumferential direction of the annular magnet. A third magnetic poles row which is magnetized in the axial direction and is magnetized in alternately opposite polarity in the radial direction is formed at a predetermined position of the second magnetic poles row. A frequency signal generating coil and a pulse signal generating coil which can respectively face the second magnetic poles row and the third magnetic poles row are formed on a printed board of the stator facing the bottom end surface of the annular magnet with an interval kept inbetween. A signal having a frequency responding to a rotation of the brushless motor is outputted from the frequency signal generating coil, and one or more pulse signals are outputted from the pulse signal generating coil for each rotation of the brushless motor.

10 Claims, 4 Drawing Sheets

BRUSHLESS MOTOR HAVING A FREQUENCY SIGNAL GENERATOR AND A PULSE SIGNAL GENERATOR

BACKGROUND OF THE INVENTION

1. Field of the Invention

The present invention relates to a brushless motor. More specifically, the present invention relates to a brushless motor providing a frequency signal generator and a pulse signal generator which can be utilized, for example, for a driving source of a rotary head of a video tape recorder.

2. Description of the Prior Art

One example of this kind of brushless motor is disclosed, for example, in the Japanese Patent Laid-Open No. 118055/1983 laid open on July 13, 1983. The brushless motor of this prior art comprises a disc-shaped rotor magnet, driving coils wound on a stator core facing the end surface of the rotor magnet through an axial air gap, and magnetic poles row for generating frequency signal magnetized in an axial direction of a rotary shaft is formed in an annular magnet provided under the rotor magnet. A magnetic poles row for generating pulse signals of a pitch different from the pitch of other portions, specifically a half of the pitch is formed at a portion of the magnetic poles row for generating a frequency signal. The two magnetic poles row of this annular magnet are both magnetized in an alternately opposite polarity in a circumferential direction. A frequency signal generating coil is formed so as to face the end surface of the annular magnet, and a portion of the frequency signal generating coil is formed as a coil for generating pulse signals so as to correspond to the pitch of magnetic poles for generating pulse signals.

In accordance with this prior art, a frequency signal responding to a rotation umber (r.p.m.) of the brushless motor is picked up from the frequency signal generating coil, and one or more pulse signals for each rotation of the brushless motor are picked up from the pulse signal generating coil.

However, in this prior art, the magnetic poles for generating pulse signals are formed at a portion of the magnetic poles in an alternately opposite polarity in the same direction, and therefore the frequency signal generating coil interlinks with magnetic flux from the magnetic poles for generating pulse signals likewise for the magnetic poles for generating frequency signal. Accordingly, the waveform of the frequency signal outputted from the frequency signal generating coil is disturbed. The study by the inventor of the present invention shows that in the prior art the waveform of frequency signal contains an amplitude modulation percentage of $2/(n-3) \times 100[\%]$ at a maximum. Here, symbol n represents the number of magnetic poles for generating frequency signal and the number of component wires of the frequency signal generating coil interlinking therewith. Thus, when a change takes place in the amplitude of the frequency signal, various inconveniences are produced in utilizing this frequency signal.

SUMMARY OF THE INVENTION

Therefore, a principal object of the present invention is to provide a brushless motor having a novel construction.

Another object of the present invention is to provide a brushless motor wherein the waveform of a frequency signal is not disturbed without being affected by magnetic poles for generating pulse signals.

A brushless motor in accordance with the present invention comprises a stator having driving coils, a rotary shaft, a rotor fixed to the rotary shaft, a rotor magnet which is included in the rotor and has a first magnetic poles row including a plurality of magnetic poles facing the driving coils of the stator, a circular magnet which is included in the rotor and includes both of a second magnetic poles row which has magnetic poles of a plural number larger than the number of magnetic poles of the first magnetic poles row and is magnetized in a direction intersecting a magnetized direction of the first magnetic poles row and is magnetized in an alternately opposite polarity in the circumferential direction and a third magnetic poles row which is formed at a predetermined portion of the second magnetic poles row and is magnetized in the same direction thereas and is magnetized in alternately opposite polarity in the magnetized direction of the first magnetic pols row, a frequency signal generating coil which faces the second magnetic poles row and generates a frequency signal by interlinking with magnetic flux from respective magnetic poles included therein, and a pulse signal generating coil which faces the third magnetic poles row and generates pulse signal by interlinking with magnetic flux from respective magnetic poles included therein.

In the brushless motor in accordance with the present invention, the direction of arrangement of the third magnetic poles row is changed which is magnetized in an alternately opposite polarity in the circumferencial direction same as that of the second magnetic poles row in the prior art. More specifically, the respective magnetic poles of the second magnetic poles row are magnetized in an alternately opposite polarity in the circumferential direction of the circular magnet, while the respective magnetic poles of the third magnetic poles row are magnetized in alternately opposite polarity in the radial direction of the circular magnet.

Thus, by forming the magnetic poles of the second magnetic poles row in an alternately opposite polarity in the circumferential direction and forming the respective magnetic poles of the third magnetic poles row in polarities opposite to each other in the radial direction, the frequency signal generating coil is not affected by the third magnetic poles row. Accordingly, in accordance with the present invention, the amplitude modulation percentage of the frequency signal is theoretically 0 [%].

In one embodiment, the brushless motor is constituted as a motor of radial air gap type, and an annular magnet as the rotor magnet is employed in this case. Then, teeth of a stator core and associated driving coils are disposed in a hollow portion of the annular magnet.

Also, in another embodiment, the brushless motor may be constituted as a motor of axial air gap type. In this case, a disc-shaped magnet is employed, and the driving coils of the stator face the end surface of the disc-shaped magnet.

As in the case with the embodiment, if all of the first, the second and the third magnetic poles rows are formed into one magnet, the number of parts of the brushless motor can be reduced, and accordingly assembling can be simplified.

These objects and other objects, features, aspects and advantages of the present invention will become more apparent from the following detailed description of the embodiments of the present invention when taken in conjunction with accompanying drawings.

DESCRIPTION OF THE PREFERRED EMBODIMENTS

Figure 1:
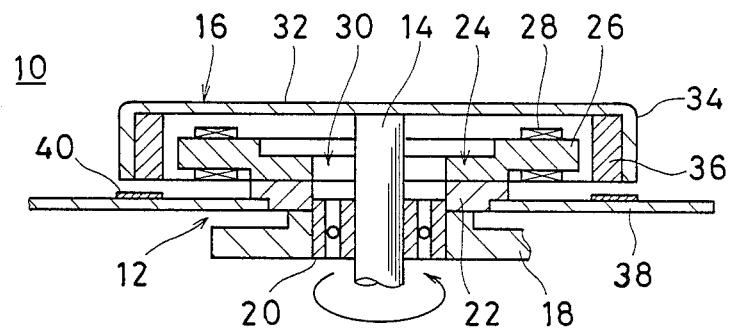
FIG. 1 is a cross-sectional view showing one embodiment in accordance with the present invention.

FIG. 1 is a cross-sectional view showing one embodiment in accordance with the present invention. In this embodiment, a brushless motor is constituted as a motor of radial air gap type, but it is pointed out in advance that the present invention is applicable likewise also to a motor of axial air gap type.

A brushless motor 10 includes a stator 12 and a rotor 16 fixed to a rotary shaft 14 penetrating through the stator 12.

The stator 12 is fixed to a case 18 comprised in a load (not illustrated) of the brushless motor 10. A bearing 20 is attached to the case 18, and the above-described rotary shaft 14 is supported rotatably by the bearing 20 so as to penetrate through the case 18.

A supporting plate 22 having a hollow portion wherethrough the rotary shaft 14 penetrates is fixed to the case 18. A stator core 24 which has a hollow portion 30 likewise and is composed of a magnetic material is fixed to the supporting plate 22. Accordingly, the stator core 24 is fixed to the case 18 through the supporting plate 22. Although not illustrated in detail, the stator core 24 has a plurality of teeth 26 projecting in a radial fashion respectively, and driving coils 28 of different phases are split-wound in sequence around the teeth 26.

Figure 2:
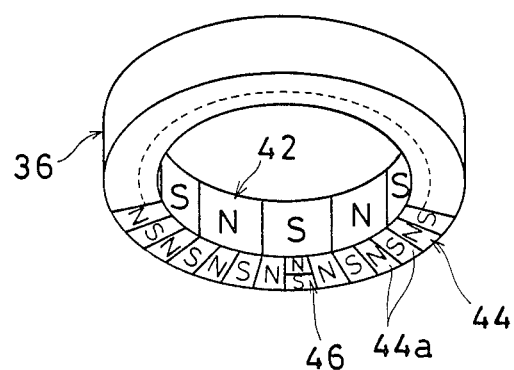
FIG. 2 is a perspective view showing an annular magnet employed for FIG. 1 embodiment.

The rotary shaft 14 extends through the hollow portion 30 of the stator core 24, and a cup-shaped rotor plate 32 which is composed of a magnetic material and has a nearly-U-shaped longitudinal cross-section is fixed to the tip thereof. An outer peripheral surface of an annular magnet 36 as shown in FIG. 2 is fixed to the inner peripheral surface of a side wall 34 of the rotor plate 32. Accordingly, the inner peripheral surface of the magnet 36 faces the respective teeth 26 of the stator core 24 with radial air gaps kept inbetween.

A printed board 38 is fixed to an outer peripheral surface of the supporting plate 22, and on this printed board 38, a driving circuit (not illustrated) for energizing or exciting the above-described driving coils 28 of different phases in a switching manner is installed and a frequency signal generating coil 40 as detailed later is formed at a position facing the bottom end surface of the above-described annular magnet 36.

Thus, the stator 12 is formed by the case 18, the supporting plate 22, the stator core 24, the printed board 38 and so on, and the rotor 16 is formed by the rotor plate 32 and the annular magnet 36 and so on.

As is obvious from FIG. 2, the annular magnet 36 includes a first magnetic poles row 42 formed on the inner peripheral wall defining the hollow portion of this magnet 36, a second magnetic poles row 44 formed on the bottom end surface of the magnet 36, and a third magnetic poles row 46 formed at the position of a predetermined magnetic pole of the second magnetic poles row 44.

The first magnetic poles row 42 is magnetized in a radial direction of the annular magnet 36 and is magnetized in an alternately opposite polarity in a circumferential direction of the annular magnet 36. The number of magnetic poles included in the first magnetic poles row 42 is "10" in this embodiment, and the respective magnetic poles face the teeth 26 of the stator core 24 as shown in FIG. 1. Accordingly, by energizing or exciting the driving coils 28 in the sequence of phases, the electromagnetic forces from the driving coils 28 and the magnetic forces of the respective magnetic poles of the first magnetic poles row 42 interact, and a rotating force is given to the annular magnet 36, and thus to the rotor 16 (FIG. 1). This means that the first magnetic poles row 42 acts as a magnetic poles row for driving rotation.

The second magnetic poles row 44 is magnetized in the axial direction of the rotary shaft 14 (FIG. 1), and is magnetized in an alternately opposite polarity in the circumferential direction of the annular magnet 36. The number of magnetic poles of the second magnetic poles row 44 is "30" in this embodiment, which is larger than the number of magnetic poles of the first magnetic poles row 42, that is, "10". This second magnetic poles row 44 constitutes a frequency signal generator in cooperation with a frequency signal generating coil as described later.

The third magnetic poles row 46 is formed at the position of a predetermined magnetic pole of the second magnetic poles row 44. In the case where this brushless motor 10 is employed as a driving source of a rotary head for a video tape, the third magnetic poles row 46 are provided corresponding to the number of heads included in the rotary head. For example, when the number of heads is two, the third rows are formed at two positions separated by 180° in mechanical angle. The respective magnetic poles of the third magnetic poles row 46 are magnetized in the axial direction of the rotary shaft 14 likewise the respective magnetic poles of the second magnetic poles row 44, but unlike the magnetic poles of the second magnetic poles row 44, they are magnetized in alternately opposite polarity in the radial direction of the annular magnet 36. The third magnetic poles row 46 constitutes a pulse signal generator in cooperation with a pulse signal generating coil as described later.

Thus, the first, the second and the third magnetic poles rows 42, 44 and 46 are formed in one annular magnet 36. Therefore, the annular magnet 36 functions as a rotor magnet and as a circular or disc-shaped magnet of the prior art and still another embodiment described later.

Figure 3:
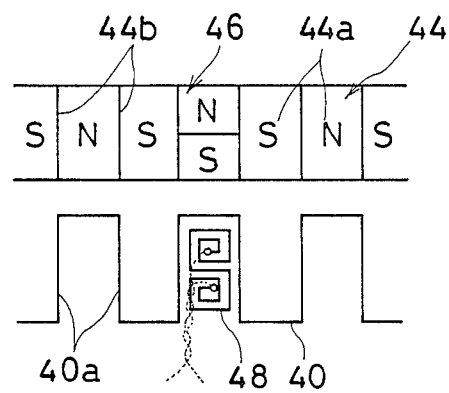
FIG. 3 is a development view showing relationships among a magnetic poles row for generating a frequency signal and magnetic poles row for generating pulse signals of the annular magnet as shown in FIG. 2 and a frequency signal generating coil and a pulse signal generating coil facing them.
Figure 4A:
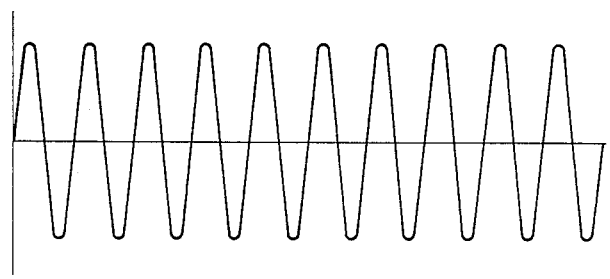
FIG. 4A is a waveform graph showing one example of a frequency signal outputted from the frequency signal generating coil.

Development of the second magnetic poles row 44 and the third magnetic poles row 46 is as shown in FIG. 3. Then, the frequency signal generating coil 40 as shown in FIG. 3 is formed on the printed board 38 (FIG. 1) by printed wiring so as to face these second and third magnetic poles rows 44 and 46. The frequency signal generating coil 40 is formed in a rectangle as shown in FIG. 3, and each of coil component wires 40a thereof extends in the same direction as a boundary line 44b of each of magnetic poles 44a of the second row of magnetic poles row 44, and is arranged with the same interval kept inbetween. Accordingly, a frequency signal as shown in FIG. 4A is generated every time when the boundary line 44b of the magnetic pole 44a of the second row of magnetic poles row 44 passes across the component wire 40a of the frequency signal generating coil 40 in response to a rotation of the annular magnet 36.

Figure 4B:
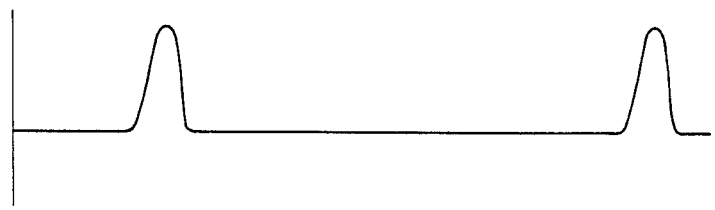
FIG. 4B is a waveform graph showing a pulse signal outputted from the pulse signal generating coil.

A pulse signal generating coil 48 is formed on the printed board 38 (FIG. 1) close to the frequency signal generating coil 40. The pulse signal generating coil 48 is disposed so as to be able to face the respective magnetic poles of opposite polarity arranged in the radial direction of the third of magnetic poles row 46. Like the frequency signal generating coil 40, the pulse signal generating coil 48 is formed also on the printed board 38 by printed wiring. A pulse signal as shown in FIG. 4B is outputted from the pulse signal generating coil 48 every time when magnetic flux from the third magnetic poles row 46 interlinks with this coil 48.

Figure 5:
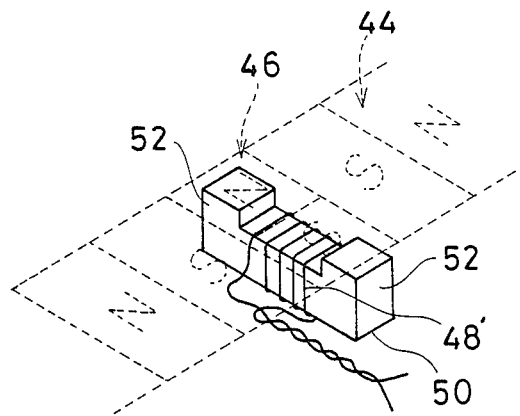
FIG. 5 is a perspective view of a major portion showing another embodiment of the pulse signal generating coil.

The pulse signal generating coil 48 may be changed as shown in FIG. 5. In a sample as shown in this FIG. 5, the pulse signal generating coil 48 is formed by an insulated wire for example, enameled copper wire, not by printed wiring on the printed board 38. To be detailed, a U-shaped core 50 is mounted at the position where the pulse signal generating coil 48 as shown FIG. 3 is to be installed, and is positioned so that respective end surfaces of two legs 52 of this core 50 can face the respective magnetic poles of the third magnetic poles row 46. Then, a frequency signal generating coil 48' is formed on a body of the core 50 by an insulated wire. Thus, by constituting the pulse signal generating coil 48' with an insulated wire wound around the core 50, the amplitude of the pulse signal obtained from the coil 48' becomes larger in comparison with the case where the coil is formed by printed wiring.

Figure 6:
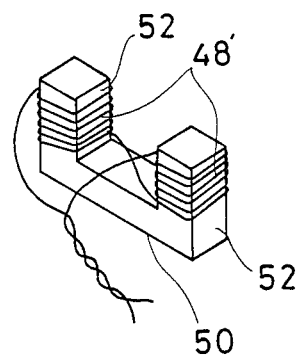
FIG. 6 is a perspective view of a major portion showing still another embodiment of the pulse signal generating coil.

The embodiment as shown in FIG. 5 may be changed as shown in FIG. 6. This means that in an example as shown in FIG. 6, the pulse signal generating coil 48' composed of an insulated wire is split-wound around the two respective legs 52, not around the body of the core 50. Like the FIG. 5 embodiment, a pulse signal having a larger amplitude is obtainable also in this case.

In either of the embodiments of FIG. 5 and FIG. 6, the core 50 has only to be fixed to a predetermined position on the above-described printed board 38.

Figure 7:
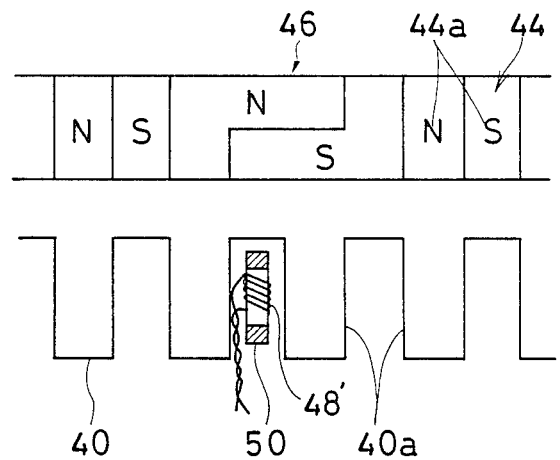
FIG. 7 is a development view which shows relationships among a magnetic poles row for generating a frequency signal and a magnetic poles row for generating a pulse signal in another embodiment of the present invention and a frequency signal generating coil and a pulse signal generating coil corresponding thereto, and corresponds to FIG. 3.

FIG. 7 is a development view which shows a major portion of another embodiment in accordance with the present invention and corresponds to FIG. 3. In this embodiment, the third magnetic poles row 46 to be formed at the position of the predetermined magnetic pole of the second magnetic poles 44 is formed so as to be longer than the width of one magnetic pole 44a of the second magnetic poles row 44 and cover the width of plural magnetic poles thereof. Then, in this embodiment, the pulse signal generating coil 48' is formed likewise the case of FIG. 5. In FIG. 7 embodiment, a pulse width of the pulse signal obtained from the pulse signal generating coil 48' will become wider than that of the previous embodiment, but it becomes easier to magnetize the third magnetic poles row 46.

Figure 8:
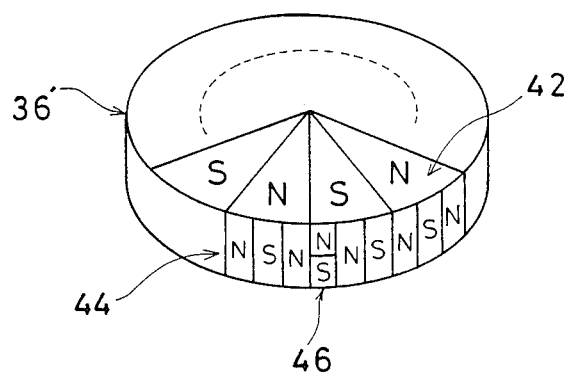
FIG. 8 is a perspective view showing a disc-shaped magnet employed for still another embodiment of the present invention.

FIG. 8 is a perspective view showing a disc-shaped magnet employed for still another embodiment in accordance with the present invention. The brushless motor employing a disc-shaped magnet 36' of this embodiment is constituted as a motor of axial air gap type unlike the FIG. 1 embodiment. In this case, the first magnetic poles row 42 including magnetic poles of "10" like the previous FIG. 2 embodiment is formed on the top end surface (or bottom end surface) of the disc-shaped magnet 36'. In this embodiment, the first magnetic poles row 42 is magnetized in the axial direction of the rotary shaft 14 (FIG. 1) and is magnetized in an alternately opposite polarity in the circumferential direction of the magnet 36'. To the teeth 26 of the stator core 24, a plurality of driving coils 28 are disposed in annular fashion so as to face the first magnetic poles row 42.

In FIG. 8 embodiment, the second and the third magnetic poles row 44 and 46 are formed on the surface not facing such a stator coil, for example, the outer peripheral surface of the disc-shaped magnet 36'. More specifically, the second magnetic poles row 44 is magnetized in a radial direction of the magnet 36' and is magnetized in an alternately opposite polarity in a circumferential direction. Also in this FIG. 8 embodiment, the second magnetic poles row 44 includes magnetic poles of a number larger than that of the first magnetic poles row 42, for example, magnetic poles of "30". Then, the third magnetic poles row 46 which is magnetized in the radial direction of the magnet 36' and is magnetized in alternately opposite polarity in the axial direction of the rotary shaft 14 (FIG. 1) is formed at the position of one predetermined magnetic pole of the second magnetic poles row 44.

For example, the frequency signal generating coil 40 and the pulse signal generating coil 48 or 48' as shown in FIG. 3 or FIG. 5 (and FIG. 6) have only to be disposed at the outside of the magnet 36' with an interval kept inbetween in the radial direction so as to face the second magnetic poles row 44 and the third magnetic poles row 46 respectively.

In either of the embodiments described above, the number of the component wires 40a of the frequency generating coil 40 is equal to the number of the boundary lines 44b of the magnetic poles 44a of the second magnetic poles row 44. However, the frequency generating coil 40 may be formed so as to include component wires 44a of an odd number of times $(2n+1)$ of the boundary lines 44b of the magnetic poles 44a of the second magnetic poles row 44. In this case, the frequency signal having a frequency of the odd number of times is obtainable, and therefore, a phase control of the motor becomes more accurate.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A brushless motor comprising:
   a stator having driving coils,
   a rotary shaft,
   a rotor fixed to said rotary shaft,
   a rotor magnet included in said rotor and including a first magnetic poles array having a plurality of magnetic poles facing said driving coils of said stator and having a predefined magnetized direction,
   a generally circular magnet included in said rotor, which includes a second magnetic poles array having magnetic poles of a number larger than the number of magnetic poles included in said first magnetic poles array and a third array of magnetic poles including at least one magnetic pole pair formed at a predetermined position of said second magnetic poles array, said second magnetic poles array being magnetized in a direction intersecting the magnetized direction of said first magnetic poles array and being magnetized so that circumferentially adjacent poles have alternately opposite polarity, and said third array of magnetic poles being magnetized in the same magnetized direction as said second magnetic poles array and being magnetized so that the poles in each said magnetic pole pair have alternately opposite polarity in the magnetized direction of said first magnetic poles array,
   a frequency signal generating coil formed so as to face said second magnetic poles array, and
   a pulse signal generating coil formed so as to face said third array of magnetic poles.

2. A brushless motor in accordance with claim 1, wherein said rotor magnet and said circular magnet are composed of one common circular magnet, and said second magnetic poles array and said third array of magnetic poles are formed on the surface of said common circular magnet different from the surface whereon said first magnetic poles array is formed.

3. A brushless motor in accordance with claim 2, wherein said common circular magnet includes an annular magnet having a hollow portion, driving coils of said stator are disposed in said hollow portion of said annular magnet,
   said first magnetic poles array is formed on an inner peripheral surface of said annular magnet defining said hollow portion, and
   said second and third magnetic poles array are formed on the surface other than the inner peripheral surface of said annular magnet.

4. A brushless motor in accordance with claim 3, wherein said second and third magnetic poles array are formed on the top or bottom end surface of said annular magnet.

5. A brushless motor in accordance with claim 2, wherein said common circular magnet includes a disc-shaped magnet,
   said driving coils of said stator are disposed so as to face the top or bottom end surface of said disc-shaped magnet,
   said first magnetic poles row is formed on said top or bottom end surface of said disc-shaped magnet, and
   said second and third magnetic poles rows array are formed on an outer peripheral surface of said disc-shaped magnet.

6. A brushless motor in accordance with claim 2, wherein said frequency signal generating coil and said pulse signal generating coil are both provided on said stator.

7. A brushless motor in accordance with claim 6, wherein said stator includes a printed board, and
   said frequency signal generating coil and said pulse signal generating coil are both formed by printed wiring on said printed board.

8. A brushless motor in accordance with claim 3, wherein said pulse signal generating coil incudes a core whose end surface can face said third array of magnetic poles and an insulated wire wound around the core.

9. A brushless motor in accordance with claim 1, wherein said third array of magnetic poles is formed so as to have a width equivalent to one magnetic pole of said second magnetic poles array.

10. A brushless motor in accordance with claim 1, wherein said third array of magnetic poles is formed so as to have a width equivalent to plural magnetic poles of said second magnetic poles array.

* * * * *